Sept. 24, 1963  R. M. ANRIG  3,104,791
TRACTOR CABLE TENSIONER
Filed July 15, 1960  2 Sheets-Sheet 1

INVENTOR.
Robert M. Anrig.
BY
Schramm, Kramer + Sturges
ATTORNEYS.

Sept. 24, 1963 R. M. ANRIG 3,104,791
TRACTOR CABLE TENSIONER
Filed July 15, 1960 2 Sheets-Sheet 2
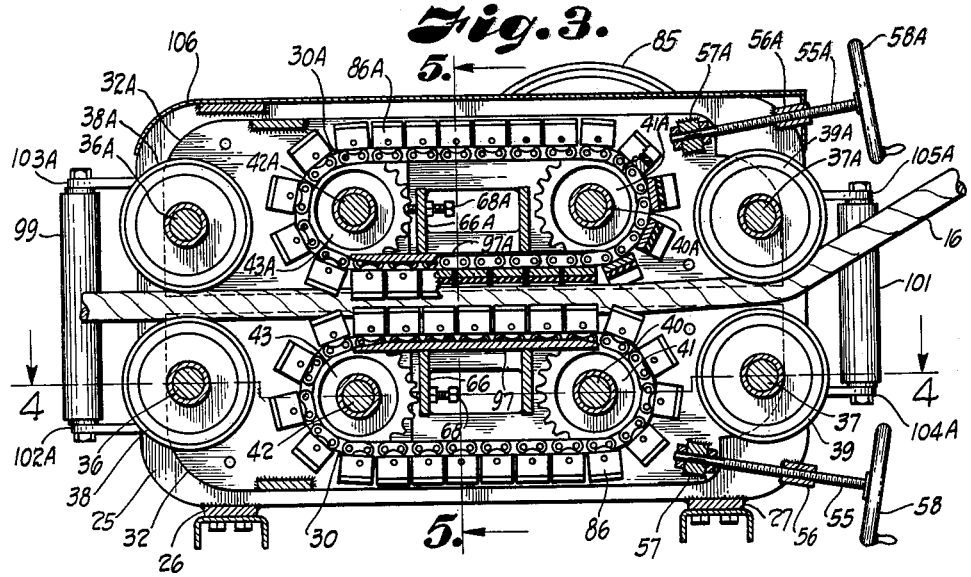
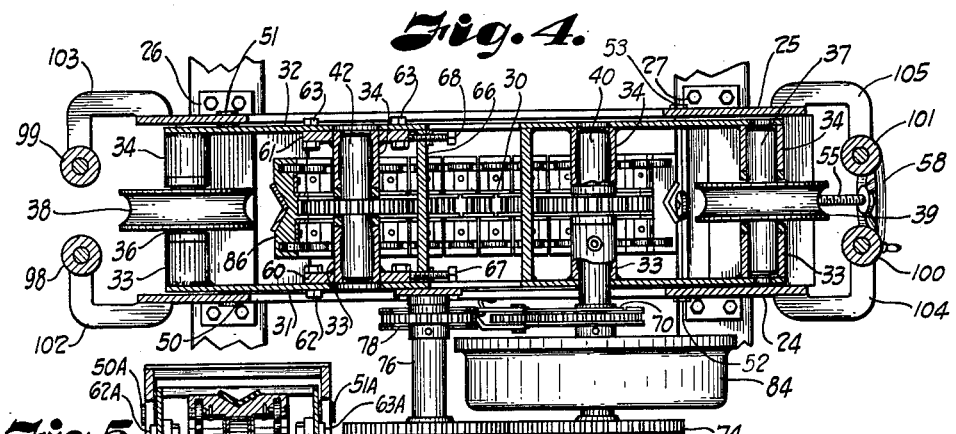
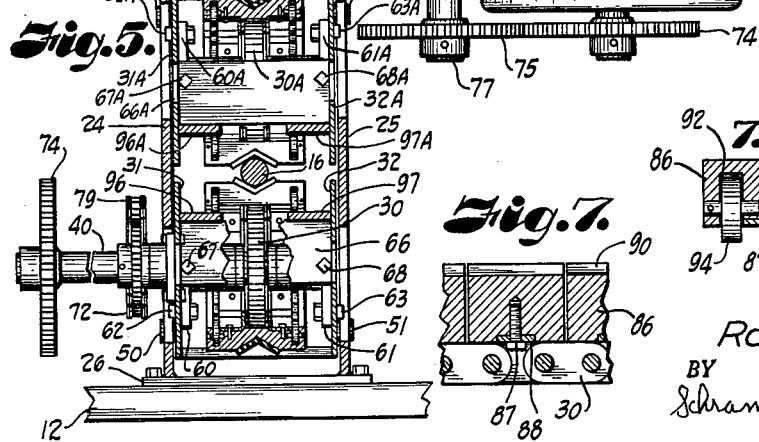
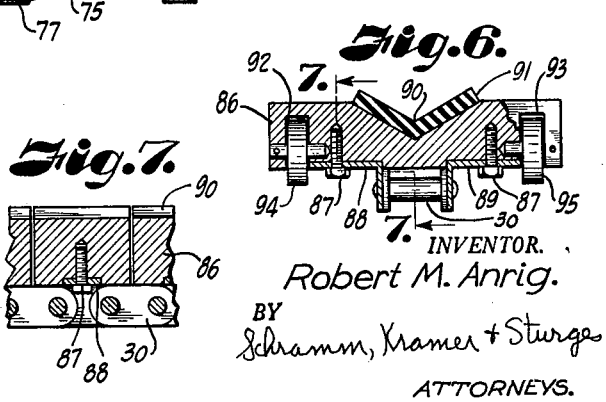
INVENTOR.
Robert M. Anrig.
BY
Schramm, Kramer + Sturges
ATTORNEYS.

United States Patent Office 3,104,791
Patented Sept. 24, 1963

3,104,791
TRACTOR CABLE TENSIONER
Robert M. Anrig, Ottawa, Kans., assignor, by mesne assignments, to The Ohio Brass Company, Mansfield, Ohio, a company of New Jersey
Filed July 15, 1960, Ser. No. 43,186
9 Claims. (Cl. 226—172)

This invention relates generally to improvements in traction apparatus for tensioning or drawing continuous elongated articles such as cable and more particularly relates to an improved arrangement for adjustably applying traction to such elongated articles.

While tractor type apparatus has heretofore been employed in drawing elongated articles such as rods and strands, such apparatus usually has the complexity and inflexibility of a fixed installation and has inadequate provision for adjustment or control because of its limited purpose. Simplicity and flexibility with increased control are requisite for many applications where cable is strung or laid. Such apparatus should preferably be portable for use in the field and must have the facility to apply tension to a cable, to retard its movement and to draw the cable from a supporting drum. Thus, efficient and direct adjustment of the applied traction is a prime requisite of any such apparatus. These and other objects are accomplished in accordance with this invention as will become apparent from a consideration of the following detailed description and claims in conjunction with the accompanying drawings.

Briefly, there is provided in accordance with this invention, a traction type apparatus having a pair of driven endless traction members disposed with opposed parallel reaches arranged to clamp and move an elongated article therebetween. The apparatus includes independent supports for each traction member which are adjustably mounted on a frame for adjustment towards and away from clamping engagement. Suitable means are provided for adjustably positioning the traction member supports on the frame, and other means are provided for independently adjusting the tension of the endless traction members. Means are provided for guiding the elongated article to and from the traction members, and a braking mechanism is included for selective application to the traction members. In a preferred form, the apparatus is mounted on a wheeled frame which also carries a source of driving power and means for coupling the driving power to the traction members.

In the drawings:

FIGURE 3 is a side elevation of the traction apparatus with one side wall of the frame and supporting members removed to show the traction members in operable position;

FIGURE 4 is a sectional view of the traction apparatus taken along the lines 4—4 in FIGURE 3;

FIGURE 5 is a sectional view taken along the lines 5—5 in FIG. 3;

FIGURE 6 is an enlarged sectional view of a segment of one of the traction members taken along a line transverse to its reach; and FIGURE 7 is a sectional view taken along the lines 7—7 in FIGURE 6.

Figure 1:
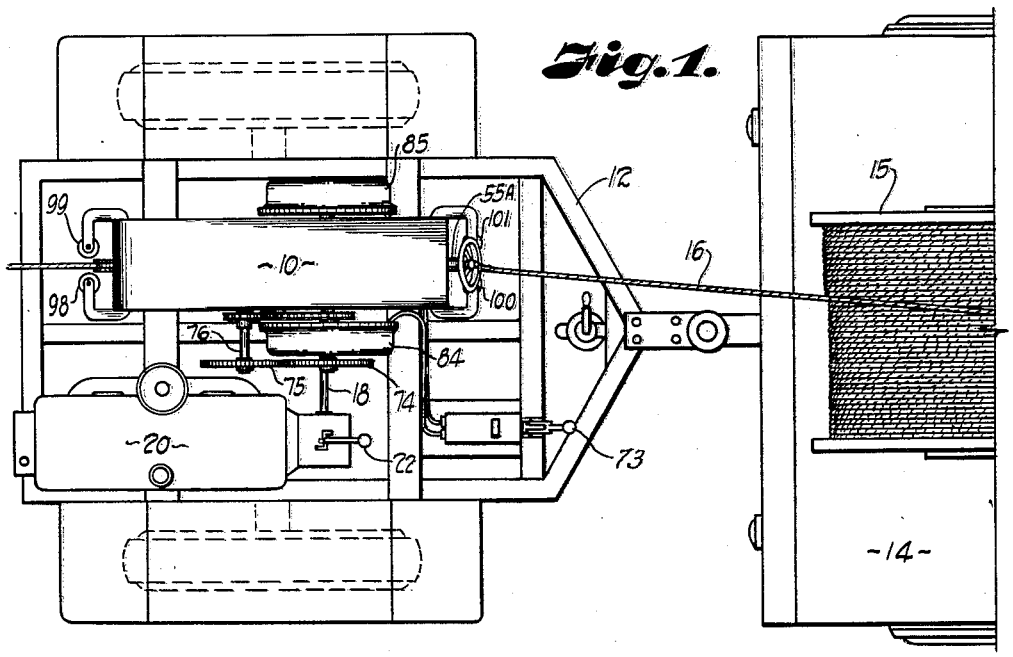
FIGURE 1 is a plan view of a preferred form of the traction apparatus mounted on a wheeled frame.

Referring now more particularly to FIGURE 1 of the drawings, the traction apparatus 10 is shown mounted on a suitable wheeled frame in the form of a trailer 12 which is coupled to the rear end of a vehicle 14. A suitable cable drum 15 is mounted on the vehicle 14 and the cable 16 is shown passing rearwardly through the traction apparatus and beyond to its point of application. In the environment shown, the apparatus is being utilized to pull the cable 16 from the drum 15. Motive power is supplied to the apparatus through the shaft 18 which is driven by the engine 20, also mounted on the trailer 12. Suitable controls 22 are provided for selectively applying the engine power to the shaft 18.

Figure 2:
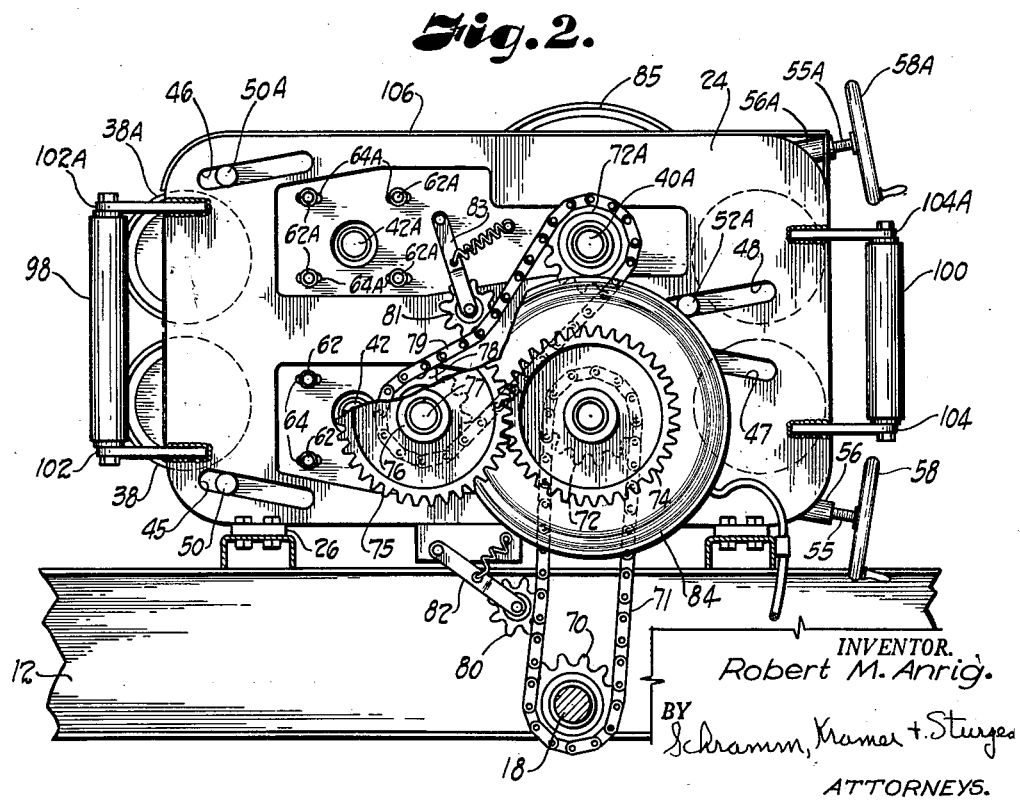
FIGURE 2 is a side elevation of the traction apparatus with portions of a gear and housing broken away to show the driving mechanism therebehind.

Reference will now be had to FIGURE 2 in conjunction with FIGURES 3, 4 and 5 of the drawings, where like parts are designated by like numerals, to provide a more detailed understanding of the operation of the traction apparatus of this invention. Essentially, the apparatus 10 includes an external supporting frame formed by rigidly connecting two side-plates 24 and 25 in spaced parallel relation to provide an open-ended box-like structure. The lower connecting members 26 and 27 serve as mounting brackets which are securely connected to the trailer frame 12. The traction members, as best shown in FIGURE 3, are in the form of endless sprocket chain assemblies 30 and 30A which are operably supported on independent internal supporting members within the confines of the side-plates 24 and 25 in a manner to be hereinafter more fully described. Since the chain assemblies 30 and 30A are similar in structure, the following detailed description will relate to only one of such members and its associated parts, it being understood that the same description is equally applicable to the other such assembly and, where reference to both is deemed essential, like parts on the other such assembly will be designated by like numerals with the suffix A.

Referring again to FIGURES 3, 4 and 5, it will be seen that each internal supporting member is formed by rigidly interconnecting two side-plates 31 and 32 in spaced parallel relation to form an open-ended box-like structure similar, though somewhat smaller in size, to the external supporting frame previously described. A plurality of tubular members 33 and 34 are mounted in aligned sets on the internal face of each side-plate 31 and 32 respectively with their axes extending transversely between the side-plates to provide aligned sleeve-bearings for a purpose to be hereinafter more fully described. As best shown in FIGURE 4, one set of sleeve bearings is mounted at each extremity of the box-like structure formed by the side-plates 31 and 32 and two additional sets are mounted intermediate such extremities. Suitable shafts 36 and 37, each carrying a grooved guide roller 38 and 39 respectively, are rotatably journaled in the bearings at each extremity of the internal support. Other shafts 40 and 42 are rotatably journaled in the intermediate bearings with the shaft 40 extending outwardly through an opening in the side plate 31 for coupling to driving mechanism to be hereinafter more fully described. Each of the shafts 40 and 42 have suitable sprocket wheels 41 and 43 keyed thereon respectively and the endless sprocket chain assembly 30 drivingly encircles both wheels. Thus, when the shaft 40 is driven it will serve as power transfer means to transmit such driving power through the sprocket wheel 41 to the chain assembly 30 and a similar arrangement will drive the chain assembly 30A, both coacting to apply traction to the cable 16.

Returning now to FIGURE 2 of the drawings in conjunction with FIGURES 4 and 5, the slide-plates 24 and 25 of the external frame are each provided with two pairs of elongated converging apertures 45, 46 and 47, 48. The side-plates 31 and 32 of each internal support are likewise provided with outward opposed projections 50, 51 and 52, 53 respectively located for guiding engagement in the correspondingly located apertures when the internal supports are disposed in surmounting co-planar relation within the box-like structure of the external frame as best shown in FIGURE 4. It is readily apparent that the internal supports may be positioned lengthwise within the external frame, and that when they are so positioned they will move towards or away from each other depending upon whether they are moved to the left or right respectively as viewed in FIGURE 2 of the drawings. Such positioning of the internal supports will cause the opposed parallel reaches of the sprocket chain assemblies 30 and 30A to also approach or move away from each other and thereby control the size of the passage therebetween and the pressure applied thereby to the cable 16.

The relative positions of the internal supports in the external frame may be incrementally adjusted by means of externally threaded spindles 55 and 55A. Each spindle extends through an internally threaded abutment 56 and 56A respectively mounted on the external frame at one open-ended extremity, and each spindle has one extremity rotatably journaled in a suitable bearing block 57 and 57A mounted respectively between the side plates of the corresponding internal support adajacent the same open end of the external frame. The threaded abutments 56 and 56A and the corresponding bearing blocks 57 and 57A are so disposed relative to each other that the spindles 55 and 55A have their axes extending along a line generally parallel the converging disposition of the elongated apertures 45, 46 and 47, 48. Suitable handwheels 58 and 58A are mounted respectively at the other extremity of each spindle 55 and 55A, and when rotated, they will cause the corresponding internal supports to move within the external frame in the manner previously described.

In addition to the foregoing arrangement for adjusting the relative positions of the internal supports within the external frame, there is also provided an arrangement for adjusting the tension of the sprocket chain assemblies 30 and 30A. In accordance with this arrangement, the intermediate sleeve bearings which support the shaft 42 are provided with apertured flanges 60 and 61 which are adjustably mounted on the corresponding slideplates 31 and 32 respectively by means of suitable bolts 62, 63 which extend through elongated apertures 64, 65 in the side-plates 31 and 32 respectively. A fixed abutment 66 is secured between the side-plates 31 and 32 intermediate the shafts 40 and 42, and suitable studs 67 and 68 are threaded through the abutment adjacent each flange 60 and 61 respectively for engagement therewith. Thus, the shaft 42 can be shifted lengthwise of the corresponding internal support to adjust the tension on the corresponding sprocket chain merely by loosening the bolts 62, 63 and adjusting the studs 67 and 68. These parts are of course duplicated on the other internal support and designated by the suffix A.

As previously described, driving power is applied to the sprocket chain assemblies 30 and 30A through the shaft 18 which carries a sprocket wheel 70 which is in turn geared through a sprocket chain 71 to a sprocket wheel 72 keyed on the driven shaft 40 as shown in FIGURES 2, 4 and 5. The shaft 40 has a gear 74 keyed on its outer extremity which meshes with another gear 75 keyed on the extremity of a sleeve 76 which is in turn rotatably journaled on a fixed spindle 77 mounted on the side-plate 24 of the external frame. Another sprocket wheel 78 is keyed on the inner extremity of the sleeve 76 and motion is transmitted to the sprocket wheel 78 through the gears 74 and 75. A suitable sprocket chain 79 transmits driving power from the sprocket wheel 78 to a sprocket wheel 72A which is keyed on the shaft 40A to drive the sprocket chain assembly 30A. Suitable idler sprocket wheels 80 and 81 are carried by rocker arms 82 and 83 respectively which are spring biased in a direction to apply tension to the motion transmitting sprocket chains 71 and 79 to accommodate any shifting of the internal supports relative to the external frame as previously described.

Conventional hydraulic brake mechanisms 84 and 85 are operably coupled on each driven shaft 40 and 40A respectively and a suitable pump, not shown, may be mounted on the trailer 12 to supply operating fluid to these brake mechanisms. The brake mechanisms can be selectively actuated by the control member 73 to apply tension to the cable 16. When the apparatus is so used, the pull on the cable 16 should be toward the left when viewed in FIGURE 3. It is understood, of course, that the engine 20 has a suitable clutch to permit selective application of the brake mechanisms 84 and 85 and permit the shafts 40 and 40A, serving as power transfer means to transfer power from the cable 16 and sprocket chain assemblies 30 and 30A to the brake 84 to be absorbed therein.

As shown in the drawings, the sprocket chain assemblies 30 and 30A do not directly contact the cable 16 but, rather, carry a plurality of shoe-like gripping members 86 and 86A, each of which present opposed outer faces which cooperate to provide a substantially confining seat for the cable 16 as will be hereinafter more fully described. As best shown in FIGURES 6 and 7, and with particular reference to sprocket chain assembly 30, the gripping members 86 are secured to the corresponding sprocket chains by means of suitable studs 87 which extend through mounting plates 88 and 89, which are in turn secured respectively to opposite sides of the sprocket chains and extend outwardly in opposite directions therefrom. The gripping members 86 thus surmount the corresponding sprocket chains and are provided in their outer face with a V-shaped groove 90 for seating the cable 16. In the preferred embodiment shown, the V-shaped groove is lined with a V-shaped liner 91 of material such as rubber or the like having a higher coefficient of friction than the material of the gripping members.

It will be noted that the gripping members are provided with recesses 92 and 93 in the underside in which are rotatably journaled rollers 94 and 95 respectively. These rollers are intended to engage ledge-like tracks 96 and 97 respectively which extend inwardly from each side-plate 31 and 32 as best shown in FIGURES 3 and 5 of the drawings. The tracks are of course duplicated on each internal support and provide rigid reaction surfaces for the opposed parallel reaches of the sprocket chain assemblies 30 and 30A and coact in the apparatus to insure positive frictional contact of the opposed gripping members 86 and 86A against the cable 16.

Reference has previously been made to the grooved guide rollers 38, 38A and 39, 39A which are rotatably mounted at each extremity of the internal supports beyond the opposed parallel reaches of the sprocket chain assemblies 30 and 30A. These guide rollers are so dimensioned that their grooved peripheries are substantially tangential to the opposed parallel reaches of the sprocket chain assemblies 30 and 30A, and they coact with vertically disposed sets of rollers 98, 99 and 100, 101 mounted at opposite ends of the external frame to provide both vertical and lateral guides to guide the cable 16 between the opposed gripping members 86 and 86A on the sprocket chain assemblies 30 and 30A. Each set of rollers 98, 99 and 100, 101 are separately mounted on suitable spindles carried by arms 102, 103 and 104, 105 respectively extending from the corresponding side-plates 24 and 25 at each end of the external frame. These arms are duplicated at each end of the vertical rollers and the upper arms are designated in the drawings by the suffix A. A suitable cover plate 106 may also be provided to protect the sprocket chain assemblies 30 and 30A and their associated parts within the confines of the external frame.

In operation, the traction apparatus of this invention can be driven to draw cable and similar articles from a drum as shown in FIGURE 1, or it may be employed to apply tension to a cable or otherwise retard its movement when it is being drawn through the apparatus by some other device. The selective application of power and brakes can be utilized in a variety of ways to apply traction to cables and the like, and the selective adjustment of the relative positions of the internal supports in the external frame utilized to both supplement the application of traction and to adapt the apparatus for various sizes of cables and the like. These controls can be further augmented by adjustment of the tension of the sprocket chain assemblies to provide a high degree of facility which in conjunction with the unitary portable nature of the apparatus enables its ready and efficient adaptation to a wide variety of uses in the field.

I have shown and described what I consider to be the preferred embodiment of my invention along with suggested modifications and it is clear that other changes and modifications may be made by those skilled in the art without departing from the scope of my invention as defined by the appended claims.

I claim:

1. A traction apparatus comprising in combination, a frame, a pair of supporting members, separate means respectively mounting said supporting members in coplanar spaced relation on the frame for independent movement toward and away from each other, an endless flexible member operably supported on each supporting member to present opposed parallel reaches adapted to clamp an elongated movable member therebetween, driven means on each supporting member drivingly engaging the corresponding endless member, means for driving said driven means, and outward opposed projections on each supporting member, said frame having elongated apertures for receiving and guiding the said projections, respectively, and said apertures converging in the frame toward each other to guide the projections of one supporting member towards and away from the projections of the other supporting member as they are positioned along the corresponding apertures, whereby the supporting members are independently adjustably positioned and thereby the opposed parallel reaches of their endless members towards and away from each other are independently adjustably positioned.

2. The traction apparatus of claim 1 wherein a pair of converging spindles is provided each having one extremity rotatably journaled in a different supporting member and the other extremity threadingly engaging the frame and extending substantially parallel to the direction of elongation of the apertures in the corresponding supporting member, whereby rotation of the spindles will move the corresponding supporting members respectively relative to the frame.

3. The traction apparatus of claim 1 wherein each endless flexible member carries along its periphery a plurality of substantially rigid members each presenting an external face towards its counterpart on the other endless member having a configuration adapted to coact therewith to form a seat for the elongated movable member, and wherein each endless member carries rollers and each supporting member has a transversely extending track adapted to engage said rollers and thereby support the opposed parallel reaches of the endless members.

4. The traction apparatus of claim 1 wherein said frame is mounted on wheels and wherein said driving means is integrally supported on the wheeled frame.

5. A traction apparatus comprising in combination, a frame, a pair of supporting members, separate means respectively mounting said supporting members in coplanar spaced relation on the frame for independent movement toward and away from each other, an endless flexible member operably supported on each supporting member to present opposed parallel reaches adapted to clamp an elongated movable member therebetween, a plurality of first grooved roller guide means each rotatably journaled respectively on transverse parallel axes at opposite extremities of each supporting member and beyond the opposed parallel reaches of the corresponding endless members, the periphery of each roller guide means being disposed in tangential relation to the opposed parallel reaches of the corresponding endless members, a plurality of other axially elongated, cylindrical roller guide means each rotatably journaled on spaced parallel axes disposed tranverse to the axes of said first roller guide means respectively at opposite extremities and sides of the frame and beyond the corresponding supporting members and beyond the first roller guide means, said first and said other roller guide means adapted to coact in guiding the elongated movable member to and from the opposed parallel reaches of said endless members, means for driving each of said endless members, and means independently coacting between each supporting member and the frame respectively to adjustably position the supporting members and thereby the opposed parallel reaches of their endless members towards and away from each other.

6. A portable traction apparatus comprising in combination, a wheeled external support having spaced parallel side-plates a pair of internal supports disposed in spaced relation in a common plane parallel and intermediate said side-plates and each having spaced parallel side-plates, parallel spaced pins extending outwardly from the side-plates of each internal support, the side-plates of said external support having spaced elongated guide apertures adjacent the pins on each internal support, the guide apertures adjacent one internal support converging from end to end toward the guide apertures adjacent the other internal support and receiving the corresponding pins therein, a pair of parallel transverse shafts rotatably journaled in spaced relation between the side-plates of each internal support, each of said shafts carrying a sprocket wheel, an endless sprocket chain encircling and drivingly engaged by the sprocket wheels on each internal support to present opposed substantially parallel reaches spaced from each other, each of said endless chains carrying a plurality of gripping members presenting opposed complementary faces adapted to receive an elongated movable member therebetween, the side-plates of each internal support having an inwardly extending ledge portion adjacent the opposed parallel reaches of the corresponding endless chain and forming a substantially rigid track therefor, said gripping members each having roller means adapted to engage the corresponding track, a pair of spindles each having one extremity rotatably journaled in a side-plate of one of said internal supports respectively, the other extremity of each of said spindles having an external thread threadingly engaging one of the side-plates of said external support, the axis of each spindle being disposed generally parallel to the line of convergence of each of the apertures in the corresponding external support, roller guide means at each end of the external and internal supports spaced from the ends of the opposed parallel reaches of said endless chain coacting to guide the elongated movable member to and from the space between said opposed parallel reaches, a source of motive power carried by the wheeled external support, driving connections from said source of motive power to one of the said shafts journaled in each internal support, and means including a brake mechanism for selectively resisting the application of power to the shafts on each internal support.

7. The traction apparatus of claim 6 wherein one of the shafts on each internal support includes a sleeve bearing having a flange at each extremity, means including elongated apertures in each side-plate of each internal support and studs in each flange of each sleeve bearing engaged and guided by the corresponding apertures to permit relative movement between the sleeve bearings and the supporting side-plates, an abutment plate extending between the side-plates of each internal support intermediate the spaced shafts thereon, and stud means threaded through each abutment plate respectively and having one extremity engaging the flange of the corresponding sleeve bearing to position the sleeve bearings relative to the supporting side-plates and thereby adjust the tension on the corresponding endless chain.

8. In an endless traction member adapted for coaction with an opposed parallel reach of a similar endless traction member to move an elongated movable member parallel to its axis, a traction assembly comprising an endless sprocket chain having spaced pairs of supports extending outwardly from each side, a substantially rigid block mounted on each pair of supports and transversely surmounting said sprocket chain, each of said blocks having recesses in its underside at each extremity and in spaced relation from the sprocket chain, roller means rotatably journaled in each recess on axes transverse to the direction of movement of the chain, and each having a peripheral portion extending beyond the underside of said block for engagement with a supporting track, the top side of each block having a groove with its side walls extending parallel to the sprocket chain, and a surface liner secured in said groove of material having a higher coefficient of friction than the material of said blocks.

9. A traction apparatus comprising in combination, a frame, a pair of supporting members, separate means respectively mounting said supporting members in coplanar spaced relation on the frame for independent movement toward and away from each other, an endless flexible member operably supported on each supporting member to present opposed parallel reaches adapted to clamp an elongated movable member therebetween, power transfer means of each supporting member engaging the corresponding endless member, power means for driving said power transfer means, means independently coacting between said supporting member and the frame respectively to adjustably position the supporting members and thereby the opposed parallel reaches of their endless members towards and away from each other, a control for selectively applying the power means, and brake mechanism with a control member for selectively actuating it, said power transfer means including on each supporting member a transversely disposed rotatable shaft, said driving means including a power driven member with connections to said shafts, said brake mechanism being connected to said transversely disposed rotatable shafts whereby the power transfer means serves for supplying power to the endless member from the power driven member when the control for the power means applies it or causing absorption of power from the endless member in the brake mechanism when the control member for the brake mechanism actuates the latter.

References Cited in the file of this patent
UNITED STATES PATENTS

| 758,996 | Meisel | May 3, 1904 |
| 920,394 | Roberts | May 4, 1909 |
| 969,873 | Isaac | Sept. 13, 1910 |
| 1,336,949 | Emerson | Apr. 13, 1920 |
| 1,534,868 | Roney | Apr. 21, 1925 |
| 1,939,796 | Spowart | Dec. 19, 1933 |
| 1,999,151 | Finley | Apr. 23, 1935 |
| 2,174,754 | Miller | Oct. 3, 1939 |
| 2,567,009 | Calhoun et al. | Sept. 4, 1951 |
| 2,612,912 | Brekle | Oct. 7, 1952 |
| 2,647,699 | Bush | Aug. 4, 1953 |
| 2,679,924 | Powell | June 1, 1954 |
| 2,699,736 | Sticelber | Jan. 18, 1955 |
| 2,742,144 | Meyerbach | Apr. 17, 1956 |
| 2,792,930 | Graham | May 21, 1957 |
| 2,884,120 | Bruestle | Apr. 28, 1959 |

FOREIGN PATENTS

| 1,103,496 | France | May 25, 1955 |

OTHER REFERENCES

German application 1,069,071, printed Nov. 12, 1959 (Kl. 81e 83/01).